(12) United States Patent
Wortmann et al.

(10) Patent No.: US 11,150,031 B2
(45) Date of Patent: Oct. 19, 2021

(54) USE OF A NITRATE SALT COMPOSITION AS A HEAT TRANSFER OR HEAT STORAGE MEDIUM FOR FIRST OPERATION OF AN APPARATUS CONTAINING THESE MEDIA

(71) Applicant: BASF SE, Ludwigshafen am Rhein (DE)

(72) Inventors: Juergen Wortmann, Ludwigshafen am Rhein (DE); Sabine Weiguny, Ludwigshafen am Rhein (DE); Katharina Federsel, Ludwigshafen am Rhein (DE); Matthias Hinrichs, Ludwigshafen am Rhein (DE); Stephan Maurer, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 183 days.

(21) Appl. No.: 16/096,319

(22) PCT Filed: Apr. 20, 2017

(86) PCT No.: PCT/EP2017/059390
§ 371 (c)(1),
(2) Date: Oct. 25, 2018

(87) PCT Pub. No.: WO2017/186566
PCT Pub. Date: Nov. 2, 2017

(65) Prior Publication Data
US 2019/0137188 A1 May 9, 2019

(30) Foreign Application Priority Data
Apr. 28, 2016 (EP) ..................................... 16167379

(51) Int. Cl.
*F28D 20/00* (2006.01)
*C09K 5/12* (2006.01)
(Continued)

(52) U.S. Cl.
CPC ............ *F28D 20/0034* (2013.01); *C09K 5/12* (2013.01); *F24S 60/10* (2018.05); *F24S 80/20* (2018.05);
(Continued)

(58) Field of Classification Search
CPC ................. F28D 20/0034; F28D 20/02; F28D 2020/0047; F24S 60/10; F24S 80/20;
(Continued)

(56) References Cited

U.S. PATENT DOCUMENTS 3,778,320 A * 12/1973 Huber ...................... A62D 3/32
588/316
4,312,722 A * 1/1982 Yoshida .................. C01B 21/50
204/252
(Continued)

FOREIGN PATENT DOCUMENTS

EP 2975099 A1 1/2016
EP 2836564 B1 * 11/2016 ............... C09K 5/12
(Continued)

OTHER PUBLICATIONS

Alexis B. Zavoico, "Solar Power Tower: Design Basis Document", SAND2001-2100, Jul. 2001, 148 pages.
(Continued)

*Primary Examiner* — Ljiljana V. Ciric
(74) *Attorney, Agent, or Firm* — Faegre Drinker Biddle & Reath LLP

(57) ABSTRACT

A heat transfer or storage medium containing a nitrate salt composition including at least one alkali metal nitrate and optionally alkaline earth metal nitrate; and, at least one alkali metal nitrite and optionally alkaline earth metal nitrite in an amount of 1.1 to 15.0 mol %. The molar amount of the alkali metal nitrite and optionally alkaline earth metal nitrite for a desired temperature is calculated by
(Continued)

$$x_{nitrite} = \frac{K_6(T)}{K_6(T) + \sqrt{P_{O2}}}$$

$X_{nitrite}$ is the mole fraction of nitrite,
$K_6(T)$ is the temperature-dependent equilibrium constant of the reaction nitrate ⇌ nitrite+½ oxygen ($NO_3^- \rightleftharpoons NO_2^- + ½ O_2$),
$pO_2$ is the oxygen partial pressure and T is the temperature of the nitrate salt composition.

5 Claims, 1 Drawing Sheet

(51) Int. Cl.
  *F28D 20/02* (2006.01)
  *F24S 80/20* (2018.01)
  *F24S 60/10* (2018.01)

(52) U.S. Cl.
  CPC ...... *F28D 20/02* (2013.01); *F28D 2020/0047* (2013.01); *Y02E 10/40* (2013.01); *Y02E 10/46* (2013.01); *Y02E 60/14* (2013.01)

(58) Field of Classification Search
  CPC ........... C09K 5/12; Y02E 10/46; Y02E 60/14; Y02E 10/40
  See application file for complete search history.

(56) References Cited

U.S. PATENT DOCUMENTS

| | | | | | |
|---|---|---|---|---|---|
| 4,559,993 | A | * | 12/1985 | Picard | C09K 5/12 252/70 |
| 4,563,295 | A | * | 1/1986 | Erickson | C09K 5/047 252/67 |
| 5,230,915 | A | * | 7/1993 | Shahidi | A23B 4/20 426/240 |
| 5,425,956 | A | * | 6/1995 | Shahidi | A23B 4/20 426/540 |
| 5,443,852 | A | * | 8/1995 | Shahidi | A23B 4/20 426/250 |
| 6,235,931 | B1 | * | 5/2001 | Wang | C08L 71/02 562/540 |
| 7,588,694 | B1 | * | 9/2009 | Bradshaw | C01B 21/48 252/71 |
| 9,133,382 | B2 | * | 9/2015 | Wortmann | C09K 5/12 |
| 9,133,383 | B2 | * | 9/2015 | Lazzari | C09K 5/12 |
| 2002/0036029 | A1 | * | 3/2002 | Kikugawa | H01F 41/026 148/101 |
| 2008/0236602 | A1 | * | 10/2008 | Bereman | A24B 15/288 131/361 |
| 2010/0038581 | A1 | * | 2/2010 | Gladen | C09K 5/063 252/67 |
| 2013/0264514 | A1 | * | 10/2013 | Wortmann | C09K 5/12 252/71 |
| 2014/0047837 | A1 | * | 2/2014 | Wortmann | C09K 5/12 60/641.8 |
| 2014/0049052 | A1 | * | 2/2014 | Wortmann | H02K 7/18 290/1 R |
| 2014/0202153 | A1 | * | 7/2014 | Wortmann | C09K 5/12 60/641.13 |
| 2019/0137188 | A1 | * | 5/2019 | Wortmann | F28D 20/0034 |

FOREIGN PATENT DOCUMENTS

| | | | | |
|---|---|---|---|---|
| WO | WO-2013153017 | A1 | * 10/2013 | C01D 7/00 |
| WO | WO-2014026915 | A1 | * 2/2014 | C09K 5/12 |
| WO | WO-2014114508 | A1 | * 7/2014 | F24S 80/20 |

OTHER PUBLICATIONS

Bauer, et al., "Overview of Molten Salt Storage Systems and Material Development for Solar Thermal Power Plants", World Renewable Energy Forum 2012, May 2012, pp. 1-8.
European Search Report for EP Patent Application No. 16167379.3, dated Oct. 12, 2018, 3 pages.
Nissen, et al., "Nitrate/nitrite chemistry in sodium nitrate-potassium nitrate melts", Inorganic Chemistry, vol. 22, Issue 5, 1983, pp. 716-721.
International Search Report for PCT/EP2017/059390 dated Jun. 21 2017.
Written Opinion of the International Searching Authority for PCT/EP2017/059390 dated Jun. 21, 2017.

* cited by examiner

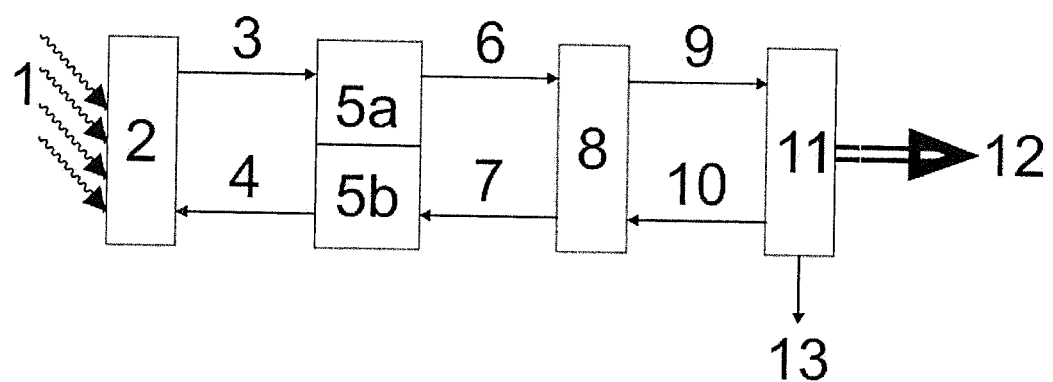

USE OF A NITRATE SALT COMPOSITION AS A HEAT TRANSFER OR HEAT STORAGE MEDIUM FOR FIRST OPERATION OF AN APPARATUS CONTAINING THESE MEDIA

CROSS-REFERENCE TO RELATED APPLICATIONS

This application is a national stage application (under 35 U.S.C. § 371) of PCT/EP2017/059390, filed Apr. 20, 2017, which claims benefit of European Application No. 16167379.3, filed Apr. 28, 2016, both of which are incorporated herein by reference in their entirety.

The present invention relates to the use of a nitrate salt composition Z comprising Z1 at least one alkali metal nitrate and optionally alkaline earth metal nitrate and also Z2 at least one alkali metal nitrite and optionally alkaline earth metal nitrite as heat transfer or heat storage medium in apparatuses in which these heat transfer or heat storage media are present, as defined in the claims, and also a process for the first start-up of an apparatus in which such a heat transfer or heat storage medium is used, as defined in the claims.

Heat transfer media or heat storage media based on inorganic solids, in particular salts, are known both in chemical technology and in power station engineering. They are generally used at high temperatures, for example above 100° C., i.e. above the boiling point of water at atmospheric pressure, in suitable apparatuses.

An example of such apparatuses in chemical plants for the industrial preparation of various chemicals is what is referred to here and in the technical field as "salt bath reactors" which are usually operated at temperatures of from about 200 to 500° C.

Heat transfer media are media which are heated by a heat source, for example the sun in solar-thermal power stations, and transport the heat comprised therein over a particular distance. They can then transfer this heat to another medium, for example water or a gas, preferably via heat exchangers, with this other medium then being able to drive, for example, a turbine. Heat transfer media can also be employed in chemical process engineering to heat or cool reactors (for example salt bath reactors) to the desired temperature.

However, heat transfer media can also transfer the heat comprised therein to another medium (for example salt melt) present in a stock vessel and thus pass the heat to storage. Heat transfer media can, however, also themselves be fed into a stock vessel and remain there. They then act both as heat transfer media and heat storage media.

Heat stores comprise heat storage media, usually compositions, for example the mixtures according to the invention, which can store a quantity of heat for a particular time. Heat stores for fluid, preferably liquid, heat storage media are usually formed by a fixed vessel which is preferably insulated against heat losses.

A still relatively new field of application for heat transfer media or heat storage media is solar-thermal power stations (also referred to here and in the technical field as "solar heat power stations") for generating electric energy.

An example of a solar-thermal power station is shown schematically in FIG. 1.

In FIG. 1, the reference numerals have the following meanings:
1 solar radiation
2 receiver
3 stream of a heated heat transfer medium
4 stream of a cold heat transfer medium
5a hot part of a heat storage system
5b cold part of a heat storage system
6 stream of a hot heat transfer medium from the heat storage system
7 stream of a cooled heat transfer medium into the heat storage system
8 heat exchanger (heat transfer medium: steam)
9 stream of steam
10 condensate stream
11 turbine with generator and cooling system
12 electric energy flow
13 waste heat In a solar-thermal power station, focused solar radiation (1) heats a heat transfer medium, usually in a receiver system (2) which usually consists of a combination of tubular "receivers". The heat transfer medium flows, usually driven by pumps, generally firstly into a heat storage system (5a), flows via the conduit (6) from there on to a heat exchanger (8) where it transfers its heat to water so as to generate steam (9) which drives a turbine (11) which finally, as in a conventional electricity-generating power station, drives a generator for producing electric energy. In the generation of electric energy (12), the steam loses heat (13) and then generally flows back as condensate (10) into the heat exchanger (8). The cooled heat transfer medium flows from the heat exchanger (8) generally via the cold region (5b) of a heat storage system back to the receiver system (2) in which it is once again heated by the solar radiation and a circuit is formed.

The storage system can consist of a hot tank (5a) and a cold tank (5b), for example as two separate vessels. An alternative construction of a suitable storage system is, for example, a layered store having a hot region (5a) and a cold region (5b), for example in one vessel.

Details of solar-thermal power stations are described, for example, in Bild der Wissenschaft, 3, 2009, pages 82 to 99, and in the following.

Three types of solar-thermal power stations are of particular importance at present: the parabolic trough power station, the Fresnel power station and the tower power station.

In the parabolic trough power station, the solar radiation is focused by means of parabolic troughs of mirrors into the focal line of the mirrors. A tube (usually referred to as "receiver") which is filled with a heat transfer medium is present there. The heat transfer medium is heated by the solar radiation and flows to the heat exchanger where it transfers its heat to steam generation, as described above. The parabolic trough tube system can in present-day solar-thermal power stations attain a length of more than 100 kilometers.

In the Fresnel power station, the solar radiation is generally focused by means of flat mirrors onto a focal line. A tube (usually referred to as "receiver") through which a heat transfer medium flows is present there. In contrast to parabolic trough power stations, the mirror and the tube do not together follow the position of the sun, but instead the positioning of the mirrors is adjusted relative to the fixed tube. The setting of the mirrors follows the position of the sun, so that the fixed tubular conduit is always located at the focal line of the mirrors. In Fresnel power stations, too, molten salt can be used as heat transfer medium. Salt Fresnel power stations are at present largely still being developed. In the salt Fresnel power station, the steam generation or the generation of electric energy occurs in a manner analogous to the parabolic trough power station.

In the solar-thermal tower power station (hereinafter also referred to as "tower power station"), a tower is encircled by mirrors, in the technical field also referred to as "heliostats", which radiate the solar radiation in a focused manner back to a central receiver in the upper part of the tower. In the receiver, which is usually made up of bundles of tubes, a heat transfer medium is heated and this produces, in a manner analogous to the parabolic trough power station or Fresnel power station via heat exchangers, steam for generating electric energy.

Heat transfer media or heat storage media based on inorganic salts have been known for a long time. They are usually used at temperatures at which water is gaseous, i.e. usually at 100° C. and more.

Known heat transfer media or heat storage media which can be used at relatively high temperature are compositions which comprise alkali metal nitrates and/or alkaline earth metal nitrates, optionally also in admixture with alkali metal nitrites and/or alkaline earth metal nitrites.

A product of Coastal Chemical Company LLC having the composition potassium nitrate:sodium nitrate of 40% by weight:60% by weight is, for example, widely used for the first start-up and also the ongoing operation of solar-thermal power stations having a maximum operating temperature of more than 500° C. Nitrate salt mixtures having a different molar sodium/potassium ratio are likewise useable and differ essentially only slightly in terms of the physical properties, for example in terms of their melting ranges. The standard publication for erection and operation of solar-thermal tower power stations using nitrate salt mixtures is Zavoico, A. B. (2001) in Solar Power Tower: Design Basis Document; SAND2001-2100. Sandia National Laboratories, San Francisco. Zavoiko gives pure potassium-sodium nitrate salt mixtures as reference heat transfer or heat storage medium for these solar-thermal power stations.

However, such nitrate salt mixtures are still capable of improvement since heating of these nitrate salt mixtures can result in formation of large amounts of decomposition gases, which can, in particular in the receiver tubes of the tower power stations, lead to risks of overheating due to gas cavities formed in the salt melt and thus reduced heat removal. The large amounts of nitrate salt mixture employed in such solar-thermal power stations usually have to be heated up very slowly and carefully, which delays the start-up process and is uneconomical. In addition, it has to be taken into account that the abovementioned pure nitrate salt mixtures partially decompose with elimination of oxygen and nitrogen oxide even at moderate heating rates.

The evolution of large amounts of oxygen gas also leads to an additional discharge of nitrogen oxides from the gas phase above the salt melt mixture into the environment. This process, also referred to as "stripping effect", leads to increased nitrate salt decomposition with formation of nitrogen oxide gas. This has the disadvantage that firstly the emissions of nitrogen oxide gases into the environment are increased and secondly the increase in corrosiveness of the nitrate salt melt mixture is accelerated.

It is known from D. A. Nissen and D. E. Meeker, Inorg. Chem. 1983, 22, 716-721, that a mixture of sodium nitrate and potassium nitrate gives off oxygen at high temperatures.

It was an object of the present invention to develop a heat transfer medium or heat storage medium which does not have the disadvantages of known nitrate salt compositions on heating-up during the first start-up of apparatuses comprising these media.

For rationality reasons, the apparatuses defined in the description and in the claims, in which the heat transfer or heat storage media are comprised, in particular their preferred and particularly preferred embodiments, for example power stations for generating heat and/or electric energy, apparatuses of chemical process engineering or metal hardening plants, will hereinafter also be referred to as "heat transfer apparatuses according to the invention".

We have accordingly found the use defined in the claims and also the process defined there.

For rationality reasons, the nitrate salt compositions defined in the description and in the claims, in particular their preferred and particularly preferred embodiments, will hereinafter also be referred to as "nitrate salt composition according to the invention".

For the present purposes, an alkali metal is lithium, sodium, potassium, rubidium, cesium, preferably lithium, sodium, potassium, particularly preferably sodium, potassium, unless expressly indicated otherwise.

For the present purposes, an alkaline earth metal is beryllium, magnesium, calcium, strontium, barium, preferably calcium, strontium, barium, particularly preferably calcium and barium, unless expressly indicated otherwise.

The nitrate salt composition according to the invention Z comprises Z1 at least one alkali metal nitrate and optionally alkaline earth metal nitrate and also Z2 at least one alkali metal nitrite and optionally alkaline earth metal nitrite as substantial constituents.

A well suited embodiment of the nitrate salt composition according to the invention comprises a Z1 alkali metal nitrate and a Z2 alkali metal nitrite as substantial constituents.

The alkali metal nitrate here is a nitrate, preferably virtually water-free, particularly preferably water-of-crystallization-free, nitrate of the metals lithium, sodium, potassium, rubidium or cesium, preferably lithium, sodium, potassium, particularly preferably sodium, potassium, generally described as $MetNO_3$, where Met represents the above-described alkali metals, with the term alkali metal nitrate encompassing both a single nitrate and also mixtures of the nitrates of these metals, for example potassium nitrate plus sodium nitrate.

The alkaline earth metal nitrate here is a nitrate, preferably virtually water-free, particularly preferably water-of-crystallization-free, nitrate of the metals magnesium, calcium, strontium, barium, preferably calcium, strontium, barium, particularly preferably calcium and barium, generally described as $Met(NO_3)_2$, where Met represents the above-described alkaline earth metals, with the term alkaline earth metal nitrate encompassing both a single nitrate and also mixtures of the nitrates of these metals, for example calcium nitrate plus magnesium nitrate.

The alkali metal nitrite here is a nitrite, preferably virtually water-free, particularly preferably water-of-crystallization-free, nitrite of the alkali metals lithium, sodium, potassium, rubidium and cesium, preferably lithium, sodium, potassium, particularly preferably sodium, potassium, generally described as $MetNO_2$, where Met represents the above-described alkali metals. The alkali metal nitrite can be present as single compound or else as a mixture of various alkali metal nitrites, for example sodium nitrite plus potassium nitrite.

The alkaline earth metal nitrite here is a nitrite, preferably virtually water-free, particularly preferably water-of-crystallization-free, nitrite of the metals magnesium, calcium, strontium, barium, preferably calcium, strontium, barium, particularly preferably calcium and barium, generally described as $Met(NO_2)_2$, where Met represents the above-described alkaline earth metals, with the term alkaline earth metal nitrite encompassing both a single nitrite and also mixtures of the nitrites of these metals, for example calcium nitrite plus magnesium nitrite.

Preference is given to the following nitrate salt compositions according to the invention:

Nitrate salt composition according to the invention comprising a Z1 alkali metal nitrate selected from the group consisting of sodium nitrate and potassium nitrate and Z2 an alkali metal nitrite as substantial constituents;

Nitrate salt composition according to the invention comprising a Z1 alkali metal nitrate and a Z2 alkali metal nitrite selected from the group consisting of sodium nitrite and potassium nitrite as substantial constituents;

Nitrate salt composition according to the invention comprising a Z1 alkali metal nitrate selected from the group consisting of sodium nitrate and potassium nitrate and a Z2 alkali metal nitrite selected from the group consisting of sodium nitrite and potassium nitrite as substantial constituents.

The nitrate salt composition Z comprises the at least one alkali metal nitrite and optionally alkaline earth metal nitrite Z2 in an amount in the range from 1.1 to 15.0 mol %, based on the sum of the components Z1 plus Z2, with this amount expressly also relating to the preferred nitrate salt compositions indicated above.

The nitrate salt composition Z according to the invention is used at a temperature in the range from 500 to 620° C., preferably in the range from 550 to 580° C., and at an oxygen partial pressure $pO_2$ over the nitrate salt composition according to the invention in the range from 0.1 to 1.0 atm, preferably in the range from 0.2 to 0.4 atm, particularly preferably in the range from 0.21 to 0.35 atm.

The content of component Z2 of the nitrate salt composition Z according to the invention is preferably guided by the desired temperature selected from the above-defined range and by the oxygen partial pressure $pO_2$ selected from the above-defined range and is calculated approximately using the following formula in which the variables have the following meanings:

$$X_{nitrite} = \frac{K_6(T)}{K_6(T) + \sqrt{P_{O2}}}$$

$X_{nitrite}$ is the mole fraction of nitrite in a nitrite/nitrate mixture, $K_6(T)$ is the temperature-dependent equilibrium constant of the reaction nitrate⇌nitrite+½ oxygen ($NO_3^- \leftrightarrows NO_2^- + ½ O_2$), with the values of $K_6(T)$ being able to be taken, for example, from D. A. Nissen and D. E. Meeker, Inorg. Chem. 1983, 22, 716-721, $pO_2$ is the oxygen partial pressure and T is the temperature of the nitrate salt composition according to the invention.

The calculated value of the molar concentration of the component Z2 is optionally reduced by 40%, preferably 20%, or increased by 20%, preferably 10%.

The molar concentration of the component Z2 as calculated from the above formula is preferably used.

However, it is possible, for example, for a particular amount of the nitrate present in the nitrate salt compositions according to the invention to be reduced to nitrite during the first start-up; for example by means of a) the following reductions: passivation of the metal parts, filler materials coming into contact with the nitrate salt mixture according to the invention or b) generation of a desired increased oxygen concentration compared to ambient air by nitrate salt decomposition. In these cases, it is advisable to reduce the calculated amount of nitrite Z2 by a certain amount.

Examples of the proportion of the component Z2 in mol % in the mixture Z for particular value pairs of temperature/oxygen partial pressure are shown below and are based on the above formula:

| Temperature | Partial pressure of oxygen | | | | | |
|---|---|---|---|---|---|---|
| T/° C. | 0.2 | 0.25 | 0.3 | 0.35 | 0.4 | p/atm |
| 500 | 1.6 | 1.4 | 1.3 | 1.2 | 1.1 | mol % [1] |
| 505 | 1.8 | 1.6 | 1.5 | 1.4 | 1.3 | mol % |
| 510 | 2.0 | 1.8 | 1.6 | 1.5 | 1.4 | mol % |
| 515 | 2.2 | 2.0 | 1.8 | 1.7 | 1.6 | mol % |
| 520 | 2.5 | 2.2 | 2.0 | 1.9 | 1.8 | mol % |
| 525 | 2.8 | 2.5 | 2.3 | 2.1 | 2.0 | mol % |
| 530 | 3.1 | 2.7 | 2.5 | 2.3 | 2.2 | mol % |
| 535 | 3.4 | 3.0 | 2.8 | 2.6 | 2.4 | mol % |
| 540 | 3.7 | 3.3 | 3.1 | 2.8 | 2.7 | mol % |
| 545 | 4.1 | 3.7 | 3.4 | 3.1 | 2.9 | mol % |
| 550 | 4.5 | 4.1 | 3.7 | 3.5 | 3.2 | mol % |
| 555 | 5.0 | 4.5 | 4.1 | 3.8 | 3.6 | mol % |
| 560 | 5.5 | 4.9 | 4.5 | 4.2 | 3.9 | mol % |
| 565 | 6.0 | 5.4 | 4.9 | 4.6 | 4.3 | mol % |
| 570 | 6.5 | 5.9 | 5.4 | 5.0 | 4.7 | mol % |
| 575 | 7.2 | 6.4 | 5.9 | 5.5 | 5.2 | mol % |
| 580 | 7.8 | 7.0 | 6.5 | 6.0 | 5.6 | mol % |
| 585 | 8.5 | 7.7 | 7.0 | 6.6 | 6.2 | mol % |
| 590 | 9.2 | 8.3 | 7.7 | 7.1 | 6.7 | mol % |
| 595 | 10.0 | 9.1 | 8.3 | 7.8 | 7.3 | mol % |
| 600.0 | 10.8 | 9.8 | 9.0 | 8.4 | 7.9 | mol % |
| 605.0 | 11.7 | 10.6 | 9.79 | 9.1 | 8.6 | mol % |
| 610.0 | 12.7 | 11.5 | 10.6 | 9.9 | 9.3 | mol % |
| 615.0 | 13.7 | 12.4 | 11.4 | 10.7 | 10.1 | mol % |
| 620.0 | 14.7 | 13.3 | 12.3 | 11.5 | 10.9 | mol % |

[1] Concentration of nitrite Z2 in the nitrate salt composition Z

Apart from the abovementioned substantial components, the nitrate salt composition Z according to the invention can also comprise small concentrations of further constituents, for example basic compounds selected from the group consisting of (i) alkali metal oxide $Met_2O$, where Met is preferably sodium and/or potassium, (ii) alkali metal carbonate, preferably sodium carbonate, (iii) alkali metal compound which decomposes to the alkali metal oxide or alkali metal carbonate in the temperature range from 250° C. to 600° C., (iv) alkali metal hydroxide MetOH, in which Met is preferably sodium and/or potassium, (v) alkali metal peroxide $Met_2O_2$, in which Met is preferably sodium and/or potassium and (vi) alkali metal superoxide $MetO_2$ in which Met is preferably sodium and/or potassium, in a total amount of the base equivalents in the range from 0.0001 to 1 mol %, preferably in the range from 0.001 to 0.05 mol %, in each case based on the nitrate salt composition Z. Lower concentrations of base equivalents are usually employed at relatively high temperatures than at lower temperatures.

The sum of all constituents of the nitrate salt composition Z according to the invention is 100 mol %.

When used as heat transfer or heat storage medium in the first start-up of the heat transfer apparatuses according to the invention, preferably of solar-thermal power stations or salt bath reactors, particularly preferably of tower power stations, the nitrate salt composition Z according to the invention is heated to a maximum operating temperature in the range from 500 to 620° C., preferably in the range from 550 to 580° C.

The nitrate salt composition according to the invention goes over into the molten and usually pumpable form at a temperature above from about 100 to 300° C., depending, inter alia, on the nitrite content and the ratio of the cations forming the mixture.

In the first start-up of the heat transfer apparatuses according to the invention, the fresh nitrate salt composition Z according to the invention, i.e. the nitrate salt composition Z which has not yet been heated to a temperature in the range from 500 to 620° C., is usually mixed in a melting apparatus which is provided with heating and crushing device and is usually arranged separately but connected to a heat storage vessel of the solar-thermal power station and melted by slow heating and introduced as melt into the heat transfer apparatus according to the invention.

The melting temperature is usually in the range from 220 to 350° C. and is generally not high enough to bring about considerable decomposition of the nitrate salt composition according to the invention.

The heat transfer apparatuses according to the invention are then supplied with this melt. In the first start-up of the heat transfer apparatuses according to the invention, this melt is then heated to the maximum operating temperature in the range from 500 to 620° C.

The abovementioned disadvantages in a conventional first start-up can be avoided by use of the nitrate salt composition according to the invention. The first start-up of the heat transfer apparatus according to the invention can be configured so that the gas phase over part of the surface or over the entire surface of the nitrate salt composition according to the invention is (a) in communication with the ambient air, which is here or in the specialist field also referred to as "open mode of operation", or (b) without exchange with the ambient air, also referred to as "closed mode of operation".

In an open mode of operation, the partial pressure of oxygen over the salt melt at the end of the start-up attains a value of 0.21 atm. In a closed mode of operation, the desired oxygen partial pressure over the nitrate salt composition can be adjusted. For example, the oxygen partial pressure can be selected so that it is in the range from 0.2 to 0.4 atm.

A preferred embodiment of the first start-up of the heat transfer apparatuses according to the invention is described below.

A preferred heat transfer apparatus is a solar-thermal power station, particularly preferably comprising heat stores for accommodating the nitrate salt composition according to the invention at different temperatures.

In one variant, the heat store usually consists of at least two, preferably two, large vessels, in general a relatively cold vessel and a hotter vessel (also referred to as "two-tank store"). The nitrate salt composition according to the invention is usually taken, preferably in the molten state, for example as pumpable liquid, from the relatively cold vessel of the solar-thermal power station and, for example, heated in the solar field of a parabolic trough plant or in a tower receiver of a tower power station. The hotter molten salt mixture which has been heated in this way is usually conveyed into the hot vessel and stored there until there is a need to generate electric energy.

Another variant of a heat store, known as a layered store, consists of one vessel in which the heat storage medium is stored in layers having different temperatures. On removal from the store, material is taken from the cold region of the store. The material is heated and returned to storage in the hot region of the store. The layered store is thus used in a manner largely analogous to a two-tank store. In thermoclinic stores, solid filler materials are also used as heat storage media in layered stores. Thermoclinic stores are also utilized in a manner analogous to two-tank stores.

An example of such a solar-thermal power station is depicted in FIG. 1. In the first start-up of such a solar-thermal power station, the relatively cold heat storage vessel of the solar-thermal power station and also the other parts of the solar-thermal power station which are in contact with the nitrate salt composition according to the invention are, usually just above the melting temperature, filled to a certain level with the fresh nitrate salt composition according to the invention. Here, the parts of the power station which are contacted by the nitrate salt composition according to the invention are preheated, for example by means of electric heaters or gas burners, to such a temperature that solids formation which would interfere in process engineering terms does not occur on contact of the salt melt with plant parts.

When utilizable amounts of nitrate salt composition according to the invention have been introduced and melted, solar energy can also be used for further melting of the salts by the salt melt being further heated to significantly above the melting range by means of the solar receiver. Heat energy which can be utilized for melting further amounts of salt is stored in such a melt.

When the intended amount of nitrate salt composition according to the invention has been completely melted, the start-up of the solar-thermal power station can proceed further. The nitrate composition according to the invention is then conveyed over or through the receiver of the solar-thermal power station and heated. During this procedure, it attains the desired maximum operating temperature in the range from 500 to 620° C.

The first start-up of the solar-thermal power station is generally concluded as soon as the nitrate salt composition Z according to the invention as heat transfer or heat storage medium has been brought to the desired operating temperature in the range from 500 to 620° C. and the solar-thermal power station assumes its intended function in ongoing operation without the composition of the nitrate salt melt changing significantly as a result of oxygen being given off. This process is significantly shorter than the previous start-up procedure, which usually takes up to several months.

Examples of such solar-thermal power stations are parabolic trough power stations, Fresnel power stations and preferably tower power stations.

In a well-suited embodiment, the nitrate salt compositions according to the invention are used, preferably in the molten state, for example as pumpable liquid, either as heat transfer medium or as heat storage medium in the solar-thermal power stations, for example the parabolic trough power stations, the Fresnel power stations or preferably tower power stations.

In a further well-suited embodiment, the nitrate salt compositions according to the invention are used, preferably in the molten state, for example as pumpable liquid, both as heat transfer medium and as heat storage medium in the solar-thermal power stations, for example the parabolic trough power stations, the Fresnel power stations or preferably the tower power stations; this process variant is also referred to as "direct molten salt" (DMS) in the technical field.

For example, the nitrate salt compositions according to the invention are used, preferably in the molten state, for example as pumpable liquid, as heat transfer medium and/or as heat storage medium, particularly preferably as heat storage medium, in tower power stations.

During use of the nitrate salt compositions according to the invention, preferably in the molten state, for example as pumpable liquid, as heat transfer medium in the solar-thermal power stations, for example the parabolic trough power stations, the tower power stations, the Fresnel power stations, the heat transfer media are conveyed through tubes heated by means of solar energy. Here, they usually convey the heat arising there to a heat store or to the heat exchanger of the steam heater of a power station.

The hot nitrate salt composition according to the invention is then usually taken off in the molten state, for example as pumpable liquid, from the relatively hot vessel of the heat store or the relatively hot region of the layered store and pumped to the steam generator of a steam power station. The steam which has been produced there and has been pressurized to above 100 bar generally drives a turbine and a generator to supply electric energy to the power grid.

At the heat exchanger (salt-steam), the nitrate salt composition according to the invention in the molten state, for example as pumpable liquid, is generally cooled to about 290° C. and usually conveyed back into the relatively cold vessel, of the heat store or the relatively cold part of the layered store. When transferring heat from the tubes which have been heated by solar energy to the store or to the steam generator, the nitrate salt composition according to the invention in molten form acts as heat transfer medium. When introduced into the heat storage vessel, the same nitrate salt composition according to the invention acts as heat storage medium in order to make, for example, demand-driven generation of electric energy possible.

However, the nitrate salt composition according to the invention is, preferably in molten form, also employed as heat transfer medium and/or heat storage medium, preferably heat transfer medium, in chemical process engineering, for example for heating reaction apparatuses of chemical production plants where a very high heat flow generally has to be transferred at very high temperatures with only small fluctuations. An example here is salt bath reactors. Examples of the production plants mentioned are acrylic acid plants or plants for producing melamine.

The present invention also provides a process for the first start-up of an apparatus in which a heat transfer or heat storage medium is used at a temperature in the range from 500 to 620° C. and an oxygen partial pressure over the nitrate salt composition in the range from 0.1 to 1.0 atm by introducing the heat transfer or heat storage medium into the apparatus and heating it up by means of a heat source, wherein the heat transfer or heat storage medium comprises a nitrate salt composition Z comprising Z1 at least one alkali metal nitrate and optionally alkaline earth metal nitrate and also Z2 at least one alkali metal nitrite and optionally alkaline earth metal nitrite in an amount of Z2 in the range from 1.1 to 15.0 mol % based on the sum Z1 plus Z2 and the molar amount of the alkali metal nitrite and optionally alkaline earth metal nitrite for a desired temperature selected from the range indicated above and for a desired oxygen partial pressure selected from the range indicated above is calculated by means of the following formula:

$$x_{nitrite} = \frac{K_6(T)}{K_6(T) + \sqrt{P_{O2}}}$$

where the variables have the abovementioned meanings and the calculated value of the molar concentration of the component Z2 is optionally reduced by 40% or increased by 20%.

Otherwise, the preferred embodiments described in the present description and the dependent claims expressly apply to the features of the last-mentioned subject matter of the present invention.

An advantage of the nitrate salt composition according to the invention and its use according to the invention in the first start-up of the heat transfer apparatuses according to the invention, preferably solar-thermal power stations, in particular tower power stations, is that the heating up of the nitrate salt composition according to the invention to the maximum operating temperature (a) occurs more quickly than when using nitrate salt mixtures of the prior art and (b) is not associated with the evolution of large amounts of gases, in particular oxygen, and, for example, the risk of damage to solar receivers of solar-thermal power stations, in particular tower power stations, due to overheating is thus reduced and (c) nitrogen oxide emission into the environment is suppressed or reduced. A further advantage (d) of the nitrate salt mixture according to the invention is that a smaller amount of salts than is customary according to the prior art can be introduced into the apparatuses according to the invention, for example solar-thermal power stations, because the decomposition of the salt mixture and thus the reduction in the amount is decreased.

The invention claimed is:

1. A process for the first start-up of an apparatus comprising:
    A. introducing a heat transfer or heat storage medium into the apparatus; and
    B. heating the heat transfer or heat storage medium to a temperature in the range from 500 to 620° C.
    wherein the heat transfer or heat storage medium comprises a nitrate salt composition Z comprising:
        Z1 at least one alkali metal nitrate and optionally alkaline earth metal nitrate; and
        and also Z2 at least one alkali metal nitrite and optionally alkaline earth nitrite in an amount of in the range from 1.1 to 15.0 mol % based on the sum Z1 plus Z2
    wherein there is an oxygen partial pressure over the nitrate salt composition Z in the range from 0.1 to 1.0 atm; and
    wherein the molar amount of the alkali metal nitrite and optionally alkaline earth metal nitrite (Z2) is calculated by means of the following formula:

$$x_{nitrite} = \frac{K_6(T)}{K_6(T) + \sqrt{P_{O2}}}$$

where the variables have the following meanings:
    $X_{nitrite}$ is the mole fraction of nitrite in a nitrite/nitrate mixture,
    $K_6(T)$ is the temperature-dependent equilibrium constant of the reaction nitrate ⇌ nitrite +½ oxygen ($NO_3^- \rightleftharpoons NO_2^- + ½ O_2$), $pO_2$ is the oxygen partial pressure and T is the temperature of the nitrate salt composition,
    and the calculated value of the molar concentration of the component Z2 is optionally reduced by 40% or increased by 20%.

2. The process according to claim 1, wherein the apparatus is a power station for generating heat and/or electric energy or in chemical process engineering.

3. The process according to claim 1, wherein the power station for generating heat and/or electric energy is a solar-thermal power station.

4. The process according to claim 3, wherein the solar-thermal power station is a tower power station.

5. The process according to claim 3, wherein the solar-thermal power station comprises at least two heat storage vessels for accommodating the nitrate salt composition Z at different temperatures.

* * * * *